United States Patent [19]
Jordan et al.

[11] Patent Number: 6,044,477
[45] Date of Patent: Mar. 28, 2000

[54] SYSTEM AND METHOD FOR AUDITING BUFFER USAGE IN A DATA PROCESSING SYSTEM

[75] Inventors: Robert Michael Jordan; Zygmunt Anthony Lozinski, both of Winchester, United Kingdom

[73] Assignee: International Business Machines Corporation, Armonk, N.Y.

[21] Appl. No.: 08/930,507

[22] PCT Filed: Jan. 31, 1996

[86] PCT No.: PCT/GB96/00205

§ 371 Date: Jan. 26, 1998

§ 102(e) Date: Jan. 26, 1998

[87] PCT Pub. No.: WO97/28501

PCT Pub. Date: Aug. 7, 1997

[51] Int. Cl.⁷ .................................................. G06F 11/00
[52] U.S. Cl. ......................................................... 714/39
[58] Field of Search .............................. 714/39, 47, 55; 395/872, 876; 711/170

[56] References Cited

U.S. PATENT DOCUMENTS

| | | | |
|---|---|---|---|
| 4,040,034 | 8/1977 | Belady et al. | 364/200 |
| 4,425,618 | 1/1984 | Bishop et al. | 364/300 |
| 5,367,637 | 11/1994 | Wei | 395/250 |
| 5,428,766 | 6/1995 | Seaman | 395/575 |
| 5,493,652 | 2/1996 | Koufopavlou et al. | 395/497.01 |
| 5,533,193 | 7/1996 | Roscoe | 395/183.15 |
| 5,608,866 | 3/1997 | Horikawa | 395/183.15 |
| 5,675,793 | 10/1997 | Crick et al. | 395/651 |
| 5,784,698 | 7/1998 | Brady et al. | 711/171 |
| 5,872,909 | 2/1999 | Wilner et al. | 395/183.14 |
| 5,915,265 | 6/1999 | Crocker et al. | 711/170 |

FOREIGN PATENT DOCUMENTS

| | | |
|---|---|---|
| 0371418 A3 | 11/1989 | European Pat. Off. |
| 0566243 A1 | 3/1993 | European Pat. Off. |
| 62-027838 | 2/1987 | Japan |
| 62-171039 | 1/1988 | Japan |
| 5334133 | 12/1993 | Japan |

OTHER PUBLICATIONS

Norton et al., IBM Technical Disclosure Bulliten, vol. 13, No. 8, pp. 2392–2393, Jan. 1971.

Beaty, "A Technique for Tracing Memory Leaks in C++", OOPS Messenger, vol. 5, No. 3, pp. 17–26, Jun. 1994.

*Primary Examiner*—Robert W. Beausoliel, Jr.
*Assistant Examiner*—Stephen C. Elmore
*Attorney, Agent, or Firm*—Jeanine S. Ray-Yarletts

[57] ABSTRACT

A system and method are provided which allows the monitoring of the allocation and use of buffers allocated from a buffer pool to processes executing within a data processing system. Conventionally, if an instance of a process crashes or loses a reference to a buffer, that buffer is rendered inaccessible by other processes. Eventually, the buffer pool will become exhausted. Errors in a communication system are difficult to attribute to a single cause and, in particular within a communication stack, often arise as a consequence of a series of events. Typically, prior art communication monitoring systems only keep track of the latest process to have had access to a buffer and do not allow an investigation into the past history of the possession or access to the buffers. Accordingly, the present invention provides a system and method for monitoring the history of the possession of or access to buffers within a communication system. An audit vector is used to store indications of all of the processes which have had access to a buffer. In the event of a malfunction or at the instigation of a user the contents of the audit vector are output for investigation.

16 Claims, 2 Drawing Sheets

SYSTEM AND METHOD FOR AUDITING BUFFER USAGE IN A DATA PROCESSING SYSTEM

The present invention relates to a monitor system and method for monitoring the operation of a data processing system such as, for example a communication system.

Most digital communication systems utilise a communication protocol which has a layered architecture. The Integrated Services Digital Network (ISDN) protocol is a typical example of a communication protocol having such a layered architecture. Further details of layered communication architectures are available in, for example, "ISDN: An Introduction", W Stallings, published by Collier Macmillan publishers, London, or "An Introduction to OSI", N. W. Heap, published by Blackwell Scientific Publications.

IBM Technical disclosure bulletin, January 1971, pp2392–2393, discloses dynamic management of a pool of buffers in which a usage history is maintained for each block of information which may be stored in a buffer. The number of buffers is less than the number of blocks of information.

Many operating systems and communication systems utilise common resources for communicating or passing data between processes executing within said system. The processes may represent a communication stack which uses a pool of buffers to facilitate communication between the processes constituting the stack. A communication stack is a plurality of processes which implement the layers of a layered communication protocol. Each process in the layer manipulates received data according to the corresponding layered architecture. The Computer Systems Research Group of the University of California at Berkeley devised the "mbuf" facility to handle buffer management and hence enable a communication stack to be implemented. A further example of a communication stack is the buffer pool service used within the ISDN component of DirectTalk/6000 release 1.5 available from International Business Machines Corporation. Further information relating to the above can be found in "Programming for the Signalling Interface (SC33-1155-01)", "Configuration and Administration (SC22-0105-01)" and "Problem Determination (SC22-0105-03)" which are all available from International Business Machines Corporation.

One of the main features of such a buffer pool service is that a process may request a buffer to be allocated to it from a pool of buffers. Typically, a process, within a communication stack, receives data from another process via a reference to an allocated buffer containing that data. The receiving process performs various operations in relation to that data and then passes the reference to the data or a modified form thereof to another process for further manipulation. Generally, each process in the communication stack implements the encoding or decoding required by a layer of a layered communication protocol and manipulates the data stored in the buffer according to the operations conventionally performed by a respective layer of the communication protocol layer. When the data stored in the buffer is no longer needed, the allocated buffer is returned to the pool of buffers for subsequent use by other processes.

Occasionally, one of the processes within a communication stack malfunctions and, for example, corrupts, loses, or does not receive the reference to an allocated buffer. Alternatively, the process which currently has a reference to an allocated buffer may crash. In any of the above events the buffer, or reference thereto, may never be returned to the buffer pool. Such a malfunction is very likely to occur during the coding and testing stages of an implementation of a communication system and therefore very likely to repeatedly occur. If the loss of an allocated buffer stems from a malfunctioning communication stack, it is very likely that further allocated buffers will be lost each time the communication system receives data. Such an error could readily exhausts the supply of buffers thereby impeding or preventing the correct operation of the communication system.

Accordingly, the present invention provides a method for monitoring the operation of a data processing system having a plurality of buffers for storing data, said buffers being accessible by a plurality of processes executing on said data processing system for processing said stored data, said method comprising the steps of allocating one of said plurality of buffers for use by said processes, storing a record of the utilisation by said plurality of processes of said allocated buffer in an audit vector, and outputting the contents of said audit vector for further processing.

The present invention advantageously allows a record of the utilisation of the buffer to be determined. A system designer or programmer can examine the contents of the audit vector to trace the history of use of the buffers. Such a facility represents a significant aid when debugging the operation of a data processing system.

Occasionally it is required that the data used to debug a data processing system be collated over a long period of time or when the data processing system has been installed at a remote customer site. It is clearly expensive in terms of time to have a system programmer present when debugging the system for the duration of the testing.

Accordingly, a further aspect of the present invention provides a method wherein one of said plurality of processes is a monitor process for periodically interrogating the status of said buffers, and the step of outputting the contents of said audit vector is in response to said interrogation by said monitor process.

The periodic interrogation of the status of the buffers by the monitor process allows data relating to the operation of the data processing system to be collated over a long period of time and without the need for a system programmer or like to be present.

It is undesirable to allow the monitor process to directly interrogate the buffer to determine the status thereof as such an interrogation may interfere with the interaction between the buffer and the process currently having access thereto.

Accordingly, the present invention provides a method wherein said buffers have a plurality of indications associated therewith to indicate which of said buffers have been allocated, said indication being maintained by at least one of said processes.

The monitor process, rather than interrogating the contents of the buffer to determine whether or not a particular buffer has been allocated, merely interrogates the indication associated with a buffer thereby mitigating the risk of interfering with the interaction between a process and a buffer.

A malfunction in the operation of the data processing system may occur whereby a process exhausts the storage capacity of an allocated buffer and, in some instances, overwrites the contents of an adjacent buffer. Such a malfunction is very difficult to detect.

Therefore, a further embodiment provides a method wherein said plurality of buffers are separated by at least one storage location containing a predeterminable pattern of data used for checking the integrity of said predeterminable pattern of data, and said step of outputting the contents of said audit vector is responsive to a determination that said integrity of said pattern of data has been violated.

The corruption of the data pattern allows a rapid determination to be made as to whether or not a process has exhausted the storage capacity of an allocated buffer. The contents of the audit vector assists a programmer or the like in determining and obviating the cause of such a malfunction. The interrogation of the predeterminable pattern may be performed by any process within the data processing system but would preferably be performed by either the services process or the monitor process.

When debugging a data processing system it is constructive to be able to determine not only that a malfunction has occurred but also the point in time when said malfunction occurred.

Suitably, an embodiment of the present invention provides a method wherein said audit vectors further comprise an indication of the elapsed time since the buffer was allocated, and said step of outputting is responsive to a determination of whether or not said elapsed time is greater than a predeterminable value.

Outputting the contents of an audit vector in response to an unduly long elapsed time allows the system programmer to determine which process. has crashed without surrendering the reference to its allocated buffer or returning that buffer to the buffer pool. The monitor process can then remove the process from memory and set the status of an associated buffer to indicate that it is free for use.

A still further embodiment provides a method wherein said audit vectors further comprise an indication of memory addresses at which corresponding buffers are stored, and wherein said step of outputting comprises outputting said memory addresses.

Yet another embodiment provides a method wherein said data processing system comprises a program counter and said audit vectors further comprise an indication of the contents of said program counter when corresponding buffers are passed to other processes, and said step of outputting comprises outputting said contents of said program counter.

It is very advantageous within the art of debugging software to be able to determine the address of buffers or the address of program instructions which effected a transfer of a buffer to another process.

Embodiments of the present invention will now be described, by way of example only, with reference to the accompanying drawings in which.

Figures 1, 2:
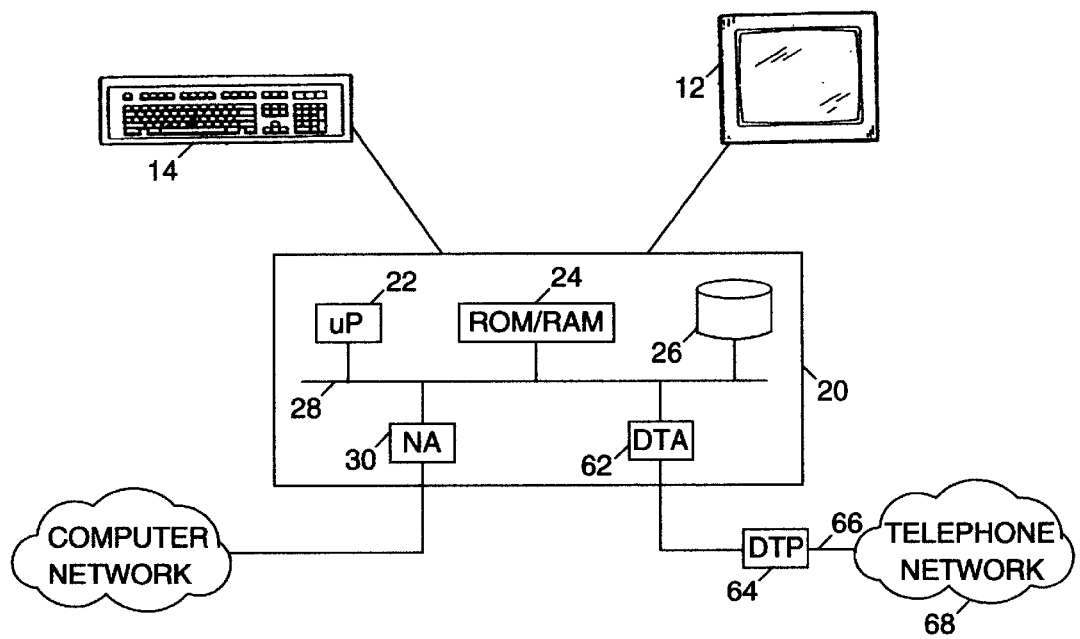
FIG. 1 is a simplified diagram of a voice response system.
FIG. 2 is a simplified diagram of the main software components of the voice response system of FIG. 1.

Referring to FIG. 1 there is shown a simplified diagram of a voice response system based on a conventional computer workstation comprising system unit 20, display screen 12, and keyboard 14. The system unit includes a microprocessor 22, ROM/RAM 24, and disk storage 26, connected together via bus 28. In order to operate as a voice response system, the computer workstation is connected to telephone line 66 via a digital trunk processor 64 and a digital trunk adapter card 62. The voice response system also includes a network adapter card 30 to allow connection to a computer network (eg a LAN).

The voice response system illustrated in FIG. 1 is based on the DirectTalk/6000 voice response system, available from IBM Corporation. The hardware components of this system are a RISC System/6000 computer workstation, plus the digital trunk processor and digital trunk adapter. The DirectTalk/6000 system connects to the telephone network through a T1 or E1 digital trunk line 66 (via a PBX in most installations). The digital trunk processor is used to demultiplex incoming signals and multiplex outgoing signals on the trunk line, and to perform log-linear conversion as appropriate. The digital trunk processor is also used to perform compression and decompression of data. The digital trunk adapter effectively acts as an interface between the workstation itself and the digital trunk processor. Further details of the DirectTalk/6000 voice response system can be found in the manual "IBM Callpath DirectTalk/6000, General Information and Planning" (publication number GC22-0100-04) and the other manuals referenced therein available from IBM Corporation.

FIG. 2 is a simple block diagram of the main software components running on the voice response system of FIG. 1. Running on the RISC System/6000 is first of all the operating system for the workstation, which in the present case is the AIX operating system 110, and then the DirectTalk/6000 software 120 itself. Optionally, other applications can run on top of the DirectTalk/6000, for example, DirectTalkMail 130, which provides standard voice messaging capabilities; this being one of a plurality of possible other applications.

Voice response systems such as those schematically illustrated in FIGS. 1 and 2 are well-known, and many variations thereof are also well-known. For example, there are many systems in which the telephone line 66 is analog and hence the digital trunk processor is omitted, and its functions are performed, where appropriate, by a suitable telephony adapter card.

Figure 3:
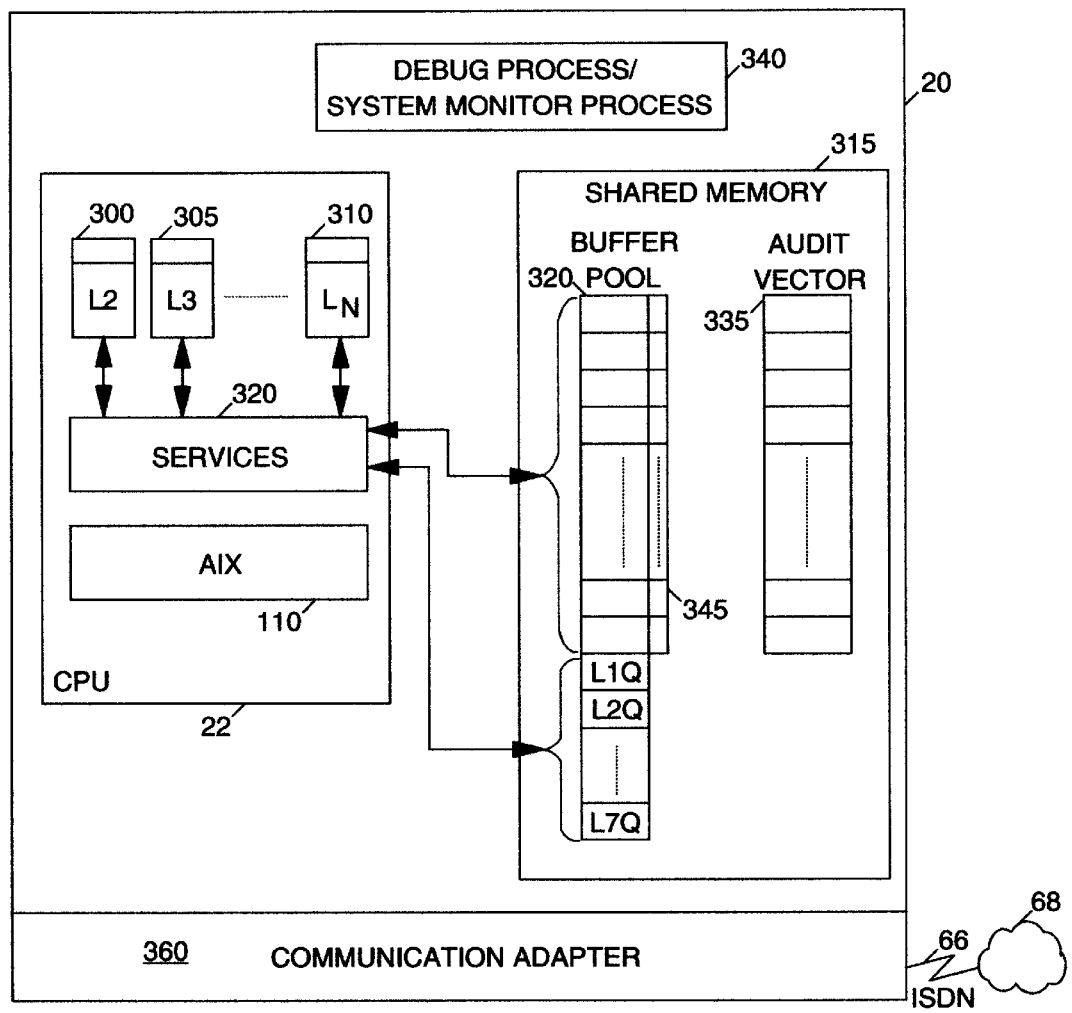
FIG. 3 is a further schematic diagram of additional features according to the invention which can be added to a voice response system such as shown in FIG. 1.

FIG. 3 schematically illustrates further features of the voice processing system 20. The system 20 comprises a central processing unit 22 on which the software runs and processes which govern the operation of the voice processing system 20, shared memory 315 for storing data in a plurality of data buffers 320, each data buffer having associated therewith an audit vector 335 for storing a record of the utilisation of the data buffer by a number of executable processes. The audit vectors 335 each comprise a plurality of memory storage location capable of storing at least identifiers associated with each process. Furthermore, each buffer has also associated therewith an indication 345 of whether or not the buffer has been allocated. The software typically comprises the operating system 110 mentioned above and a number of processes providing various degrees of functionality. A communication stack is implemented using separate layer processes 300 to 310; one for each layer of, for example, the ISDN protocol. Each layer process implements the data manipulations required in order to give effect to the corresponding layer of the layered communication protocol to be used. The shared memory 315 is used to implement a buffer pool 320 having a plurality of buffers. The buffers are used to store, for instance, the ISDN data used by the layer processes. ISDN data is received from the network 68 via the digital trunk processor 64 and the digital trunk adapter 62. These are schematically represented as a communication adapter 350. When data is initially received from the network, the communication adapter 350 informs the first layer, L2, of the communication stack of the arrival of that data. The first layer, L2, then obtains a buffer and stores the received data therein.

The shared memory further comprises a plurality of message queues 325 which are used for inter-process communication as is well known within the art. It can be seen from FIG. 3 that the message queues do not have audit vectors associated therewith. The queue of, for example, the processes implementing a communication stack, typically contains references to a plurality of buffers which store data to be processed before being passed to the next appropriate layer process of the communication stack. The layer process to which the reference is passed varies according to whether data is being transmitted, and hence passed to increasingly lower layers of the stack, or received, and hence passed to increasingly higher layers of the stack.

The shared memory 315 is accessible by the layer processes 300 to 310 and the communication adapter 350 via a services process 330. The services process is implemented as a Unix library which is linked with the layer processes and which runs within the same process as a layer process. If a process requires a buffer for storage of data, a call to that effect is made to the services process 330. Each process has an identifier associated therewith and the call to the service process contains that identifier. The services process 330 locates an available buffer by examining a respective one of a plurality of indicators associated with the buffers. The indicators are used to determine whether or not a respective buffer has been allocated. An indicator is, for example, set to one predeterminable value if the buffer has already been allocated and to another predeterminable value is the buffer has not already been allocated. For example, the indicator may comprise a single bit of memory which can be toggled between zero and one thereby indicating that the buffer has or has not been allocated respectively. Once an available buffer has been located, a reference thereto is passed, using the process identifier, to the requesting process. That requesting process can then use that reference to store directly data in or directly manipulate the data in the buffer. The services process is used by the layer process to allocate and deallocate buffers as well as to pass them or a reference to a buffer to another process.

Similarly, when the requesting process no longer requires the use of the allocated buffer, a call to that effect is made to the services process 330 which de-allocates the buffer by setting the respective indicator accordingly. Once the indicator has been appropriately set, that buffer is available for use by other processes within the voice processing system 20.

AS mentioned above inter-process communication is effected using the message queues 325. A process passes to the next process the reference to the buffer containing data destined to be manipulated by that other process via a call to the service process and the message queue of that process. The calling process supplies the following parameters to the service process, its process identifier, the process identifier of the process to which the reference is to be passed and the reference. The service process ensures that the reference to that buffer is placed in the message queue of the appropriate process. The other process will eventually read the reference to the buffer and process the data stored therein accordingly.

Each buffer has associated therewith one of a plurality of audit vectors 335. An audit vector comprises a plurality of memory location within the shared memory and is used to store an indication of which processes have had access to the corresponding buffer since the buffer was allocated by the service process 330. Each buffer has a corresponding audit vector. The audit vector stores the process identifier associated with each process. Access to the audit vector is indirect via the services process. When a buffer is first allocated the identifier of the requesting process is placed in the audit vector before passing the reference to the requesting process.

Once a buffer has been allocated, the process identifier of each process which has access to the buffer is also added to the audit vector associated with that buffer. Accordingly, a record of the history of the possession of or access to a particular buffer by various processes is constructed.

As indicated above, when a process in possession of a reference to a buffer no longer requires that buffer and does not need to pass that reference to another process, a call to that effect is made to the service process 330. The service process 330 changes the allocation status of the indicator associated with the buffer to indicate that the buffer is free for use by other processes. The service process also clears the audit vector associated with the buffer.

Still referring to FIG. 3, the voice processing system 20 contains a monitor process 340 capable of interrogating and monitoring various aspects of the voice processing system 20. The monitor process 340 can, for example, determine whether any, and, if so which, buffers are indicated as having been allocated. Again, such a determination can be effected by checking the indicators 345 associated with the buffers 320.

Furthermore, upon determining that a buffer has been allocated, the monitor process can access and output, on the display 12 or to any other predeterminable device, the contents of the audit vector associated with that allocated buffer. The data output from the audit vector represents a history of the possession of the buffer associated with that audit vector. Such a history can be used to trace, and hence debug, the operation of the voice processing system. A system designer or programmer can use the contents of the audit vector to identify which processes, if any, are malfunctioning or otherwise adversely affecting the operation of the voice processing system.

In addition to the above functions performed by the service process, the service process can also perform a check to determine whether or not an error in the operation of the voice processing system has occurred. When a process calls the service process with a view to passing a buffer reference to another process, the service process also compares the process identifier of the last entry in the audit vector with that of the process calling the services process to determine whether or not the process surrendering the reference is the same as the process which last acquired the reference. In the event that the identifiers are not identical, the services process 330 sends a message to the monitor process with an indication to that effect. The monitor process may then alert the system designer or programmer of the error and output the contents of the audit vector concerned so that a investigation as to the cause of fault can be conducted. Alternatively, the error can be stored in an error log for later investigation by the system designer or programmer.

Figure 4:
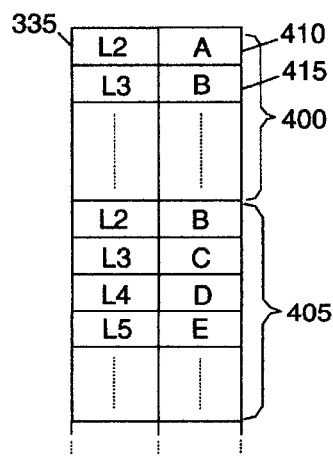
FIG. 4 illustrates schematically the contents of an audit vector.

The audit vector may contain other information such as, for example, a time stamp which represents the time of initial allocation of the buffer and the time at which the reference to the buffer was passed to another process. The time stamp may be derived from a universal system clock. The time stamp is used by the monitor process in order to determine the elapsed time since the reference was last passed to another process. The monitor process reads the time stamp of the last entry in the audit vector and compares it with the current time according to the universal system clock. If the difference is greater than a predetermined value the contents of the audit vector are output to the display or stored for the attention of the system designer or programmer. A high elapsed time may indicate that the process indicated as being in possession of the reference has malfunctioned. FIG. 4 illustrates schematically possible contents of two audit vectors 335. It can be seen from the first audit vector 400 that two processes L2 and L3 have had access to the buffer associated with the audit vector 400. Furthermore, the time at which a particular processes acquires access to a buffer is also recorded. It can be seen from FIG. 4 that process L2 acquired access at time A 410 and that process L3 acquired access at time B 415. Similarly, it can be seen that the second audit vector 405 has been accessed by processes L2, L3, L4 and L5 at respective times of B, C, D, E. In this manner, a record of the processes which have had access to a buffer and the time at which such access was effected is constructed in the audit vector.

Still further an audit vector may also contain information relating to the memory address at which a corresponding buffer is stored and/or the contents of the program counter of the instruction which passes the reference to the buffer to another process when that instruction is executed.

Upon determining that a process has crashed before surrendering the reference to the buffer or returning the buffer to the buffer pool, the monitor process or the system programmer can remove the crashed process from memory and set the status of the associated buffer such that it is available for use by other processes.

Although a process in the embodiment described above surrenders possession of or access to a buffer via a call to the service process, an alternative embodiment can be realised in which the process utilising the buffer can directly effect the changes to the status of the buffer indicator and the audit vector associated with the buffer.

As indicated above each buffer of the buffer pool is implemented using shared memory. Conventionally, the buffers are contiguous and as such there is a risk that processes may inadvertently write data to a buffer other than the buffer for which the process has a reference. It order to mitigate the above problem, inter-buffer gaps are used. The inter-buffer gaps comprises a plurality of storage locations. The storage locations contain a predeterminable pattern of data. The monitor process periodically checks the contents of the inter-buffer gaps to determine whether or not the pattern has been overwritten. If it is determined that a process has overwritten the predetermined pattern of data and possibly the contents of the next buffer, the monitor process outputs an indication to that effect to the system programmer or designer as well as outputting the contents of the audit vector associated with the particular buffer or buffers concerned.

Notwithstanding that the above embodiments have been described within the context of a voice processing system the present invention is not limited thereto. The invention can also be used within any data processing system having a need to provide data related to the history of use of data storage buffers. For example, an operating system may need to monitor the use of buffers which have been assigned for the input or output of data to and from storage devices. Still further, the windows of an operating system invariably have associated therewith a buffer which is used to storage input commands or to receive data from other windows. As each window is created a window buffer is assigned for use therewith. The window buffer may be one of a plurality of available window buffers. It will be appreciated that the utilisation of such a window buffer should be monitored to determine whether or not the windowing software and, hence the operating system, is functioning as intended.

We claim:

1. A method for monitoring the operation of a data processing system having a plurality of buffers for storing data, said buffers being accessible by a plurality of processes executing on said data processing system for processing said stored data, said method comprising the steps of:
    allocating said plurality of buffers for use by said processes;
    maintaining a plurality of audit vectors, each audit vector being associated with a corresponding one of said plurality of buffers;
    storing in each audit vector a record of each process which has been allocated the buffer associated therewith and the time of such allocation; and,
    outputting the contents of at least one audit vector for further processing.

2. A method as claimed in claim 1, wherein one of said plurality of processes is a monitor process for periodically interrogating the status of said buffers, and the step of outputting the contents of said at least one audit vector is in response to said interrogation by said monitor process.

3. A method as claimed in claim 2, wherein said buffers have a plurality of indications associated therewith to indicate which of said buffers have been allocated, said indication being maintained by at least one of said processes.

4. A method as claimed in claim 3, wherein said plurality of buffers are separated by at least one storage location containing a predeterminable pattern of data used for checking the integrity of said predeterminable pattern of data, and said step of outputting the contents of said at least one audit vector is responsive to a determination that said integrity of said pattern of data has been violated.

5. A method as claimed in claim 3, wherein said step of outputting is responsive to a determination of whether or not the time elapsed since the buffer was allocated is greater than a predeterminable value.

6. A method as claimed in claim 3 wherein each said audit vector further comprises an indication of the time elapsed since a reference thereto was last passed between processes, and said step of outputting is responsive to a determination of whether or not said time elapsed is greater than a predeterminable value.

7. A method as claimed in claim 1, wherein said plurality of audit vectors further comprise an indication of memory addresses at which corresponding buffers are stored, and wherein said step of outputting comprises outputting said memory addresses.

8. A method as claimed in either of claims 1 or 7, wherein said data processing system comprises a program counter and said plurality of audit vectors further comprise an indication of the contents of said program counter when corresponding buffers are passed to other processes, and said step of outputting comprises outputting said contents of said program counter.

9. A monitor system for monitoring the operation of a data processing system having a plurality of buffers for storing data, said buffers being accessible by a plurality of processes executing on said data processing system for processing said stored data, said system comprising;
    means for allocating said plurality of buffers for use by said processes;
    a plurality of audit vectors, each audit vector being associated with a corresponding one of said plurality of buffers;
    means for storing in each audit vector a record of each process which has been allocated the buffer associated therewith, and the time of such allocation; and,
    means for outputting the contents of at least one audit vector for further processing.

10. A system as claimed in claim 9, wherein one of said plurality of processes is a monitor process for periodically interrogating the status of said buffers, and said means for outputting the contents of said at least one audit vector is responsive to said interrogation by said monitor process (340).

11. A system as claimed in claim 10, wherein said buffers have a plurality of indications associated therewith to indicate which of said buffers have been allocated, said indication being maintained by at least one of said processes.

12. A system as claimed in claim 11, wherein said plurality of buffers are separated by at least one storage location containing a predeterminable pattern of data used for checking the integrity of said predeterminable pattern of data, and said means for outputting the contents of said at least one audit vector is responsive to a determination that said integrity of said pattern of data has been violated.

13. A system as claimed in claim 11, wherein said means for outputting is responsive to a determination of whether or not the time elapsed since the buffer was allocated is greater than a predeterminable value.

14. A system as claimed in claim 11, wherein each said audit vector further comprises an indication of the time elapsed since a reference thereto was last passed between processes, and said means for outputting is responsive to a determination of whether or not said time elapsed is greater than a predeterminable value.

15. A system as claimed in claim 9, wherein said plurality of audit vectors further comprise an indication of the memory addresses at which corresponding buffers are stored, and wherein said means for outputting comprises means for outputting said memory addresses.

16. A system as claimed in either of claims 9 or 15, wherein said data processing system comprises a program counter and said plurality of audit vectors further comprise an indication of the contents of said program counter when corresponding buffers are passed to other processes, and said means for outputting comprises means for outputting said contents of said program counter.

* * * * *